Aug. 9, 1927.  
C. L. HOFF  
1,638,034  
TREAD GRIP FOR VEHICLE TIRES  
Original Filed March 1, 1922
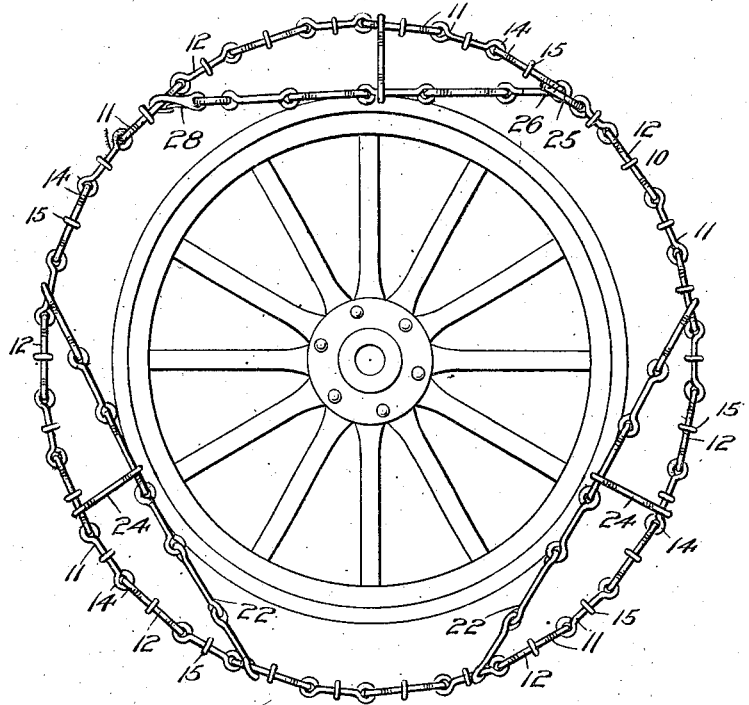
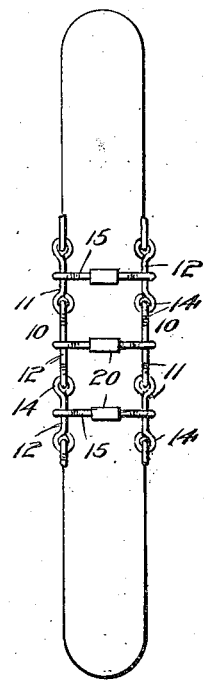
Inventor  
Carlton L. Hoff  
By Church & Church  
His Attorneys Patented Aug. 9, 1927.

1,638,034

UNITED STATES PATENT OFFICE.

CARLTON L. HOFF, OF YORK, PENNSYLVANIA.

TREAD GRIP FOR VEHICLE TIRES.

Application filed March 1, 1922, Serial No. 540,321. Renewed September 26, 1925.

This invention relates to certain improvements in tread grips for tires, particularly those intended for use on automobiles wherein the tire is pneumatic and the resilient tread surface is usually curved in cross section.

A principal object of the present invention is to provide a simple and efficient tread grip that will give a considerably greater length of service than will the usual welded link curb chain anti-skid devices commonly used. A further object of the invention is to simplify the securing of the tread grip on tires of somewhat different diameter.

A still further object of the present invention is the provision of a pair of grip members of substantially the same diameter as the tire itself, these grip members being built of a number of non-welded elongated eye-links and held in proper spaced relation by a series of rigid transverse members loosely sliding on the elongated eye-links.

In the drawings,—

Figure 1 is a side elevation of a wheel equipped with a tread grip embodying the present invention.

Fig. 2 is an edge elevation of the parts shown in Fig. 1.

Fig. 3 is a perspective of one of the transverse links.

Fig. 4 is an elevation of a modified and somewhat simpler form of transverse connecting link.

The tread grip of the present invention embodies a pair of parallel grip members 10 preferably formed of a plurality of bars 11 each having a fairly long body portion 12 and being turned at each end to form eyes 14. The two grip members 10 are spaced apart such a distance as to cause them to occupy positions at opposite edges of the tread surface of the tire and in such position as to contact with the surface of the roadway under the edges of the tread surface of the tire.

These two parallel grip members 10 are held in proper spaced position with relation to each other and to the tire by a number of transverse connecting links 15, each formed of a single bar of metal, preferably high carbon steel difficult to weld. An inner central portion 16 of the transverse link may be either straight or curved slightly to agree with the convex surface of the tread portion of the tire. The bar or body forming the link is then bent at 17 to form a loop or eye 18 to receive loosely the straight portion of one of the bars 11 and is then reversed on itself, the ends 19 being substantially alined and coacting to form a straight outer central portion with its terminal parts in close proximity to each other thus forming at each end of both central portions a substantially closed connecting link. The rigid cross bars or links engaging loosely the side grip members have a movement independent of the creeping tendency of said tire grip members. Both eyes 18 are disposed with their openings for securing the bars 11 disposed within the laterally projected outlines of the outer straight portion formed by the ends 19. It is within the scope of the disclosure to have the terminal portions or ends of the bar within the lower straight portion 16.

The sleeve or shield 20 surrounds the central portions 16 and 19 conveniently serving to protect the terminal parts and in addition to give increased traction. The traction sleeve 20 surrounding the rigid bar between its end eyes 18 is non-circular in cross section, is elongated in one direction, and has its two opposite sides flat to form opposed flat faces. It is particularly to be noted that when one of the transverse connecting links is at the top of the tire the mid-portion 16 will be resting upon the tread portion of the tire and the outer straight portion 19 will lie above the portion 16. The distance from one eye 18 to the other should be such that the grip members 10 will be positioned on opposite sides of the ground engaging tread portion of the tire but still sufficiently near the center to lie under the edges of the tread surface when the latter is in contact with the ground or roadway and is consequently flattened.

The grip members positioned in the manner heretofore described effectively prevent any side slip or skidding of the vehicle and are also in such a position as to increase the tractive effort. It is particularly to be noted that while it is the transverse chains themselves that prevent skidding in the ordinary type of tread grip that in the construction here described the circular grip members have this function and they form in effect continuous gripping surfaces between the tire tread surfaces and the roadway and effectually prevent the vehicle from starting to move laterally, or to skid as it is commonly called.

In order to prevent the side members from being pulled off the tire, in case a tendency to skid arises, the grip members are supplied with a plurality of chord retaining side members 22. These are preferably two in number and may be permanently secured to the grip members 10 in any desired manner, for example, as shown in Fig. 1 where the members 22 are themselves formed of eye-links and are fastened directly to the straight portion of one of the links 12. If desired an additional link 24 may be supplied centrally of each of these chord members to prevent excessive vibration.

A third chord member is provided by the grip member itself. A steel ring 25 is secured to one end of the grip member chain and the other end is passed through this ring and brought over at a sharp angle as at 26 and the free end of the grip member is secured to one of the links 12 by a snap hook 28. It will be understood that the grip member is pulled taut and into proper position before the free end is snapped over one of the links. This arrangement will not only permit the use of a given size of tread grip on tires of different diameters, but will insure at all times a firm and secure positioning of the tread grip on the tire without the need for any adjustable means such as a turnbuckle or a belt and buckle as are frequently used.

In Fig. 4 a slightly modified form of connecting link is shown, the principal difference being that the rod or bars are made somewhat shorter in length so that while the distance between the two loops 18 is the same as in the preferred type the ends 30 will not abut. This modified transverse link like the preferred form is free to slide along the straight portions of the eye-links 12, and the ends 30 by gripping the ground increase the traction to an appreciable extent. It is obvious that the rigid cross members of the preferred form may be made with or without the sleeve or guard 20. In any of the various forms here described the transverse members have free movement longitudinally of the grip members and hence are independent of the creeping tendency of the parallel grip members.

What I claim is:

1. A transverse connecting link for a tread grip for vehicle tires consisting of a rigid bar adapted to be placed transversely of the vehicle tire on its tread portion, said bar being turned radially inwardly at the sides of the tire so that the contour of the bar will approximate the contour of the tread surface of the tire, said bar having its end portions turned to receive a grip member, and said ends extending radially outward beyond the plane of the central portion of the bar to increase traction.

2. A transverse link for a tread grip for vehicle tires consisting of a bar having a mid-portion adapted to engage the tread surface of a vehicle tire and having its ends looped to engage a grip member at either side, the ends of said link being in proximity to each other, and a shield to protect said juxtaposed ends.

3. A tread grip for vehicle tires comprising a plurality of continuous parallel chain grip members having a space between them through which the tread surface of the tire projects into contact with the ground, substantially rigid transverse link connections loosely connected at opposite ends with the grip members to hold said members at opposite edges of the tread surface of the tire in position to be constantly pinched between the sides of the tire and the roadway, each of said rigid transverse links consisting of a bar bent to form loops or eyes to engage said grip members and having the ends of the bar brought into proximity with one another, said juxtaposed ends being more distant from the tread surface than is the mid-portion of the substantially closed connecting link whereby the portion of the transverse connecting link formed by the ends of the bar will increase the traction.

4. A tread grip for vehicle tires, consisting of a plurality of longitudinal grip members each consisting of a plurality of eye-links, a plurality of rigid transverse members each loosely engaging an eye-link of each of said grip members, said transverse members each having a loop or eye to engage a side grip member and having its ends brought back on themselves to form a substantially closed link, a sleeve or shield secured to said transverse member at substantially its central portion to protect the ends of the transverse member and to give added traction, a plurality of flexible side members secured to each of said grip members by each of their ends, and an additional flexible side member adapted to be selectively engaged with the links of said grip members to adjustably secure said grip members to the tire in such position that the circular length of said grip members shall be slightly less than the periphery of the tire.

CARLTON L. HOFF.